H. C. FUHRMAN.
OPERATING MECHANISM FOR METERS.
APPLICATION FILED JUNE 18, 1912.
1,191,171.
Patented July 18, 1916.
2 SHEETS—SHEET 1.
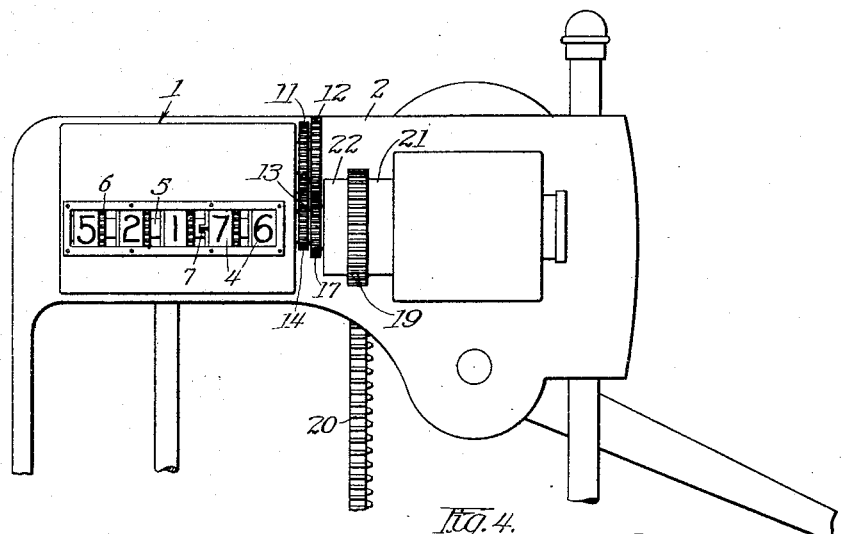
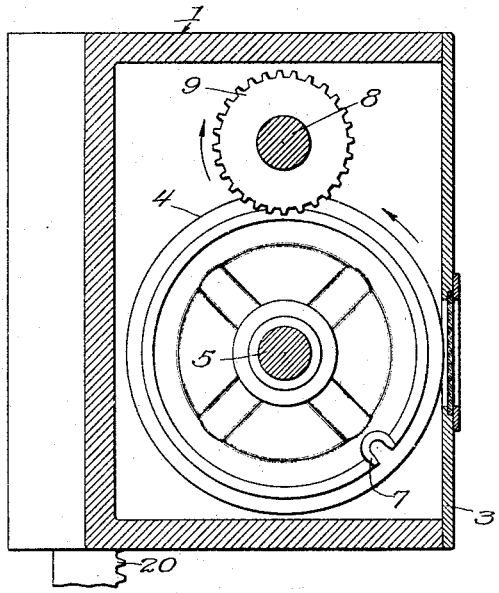
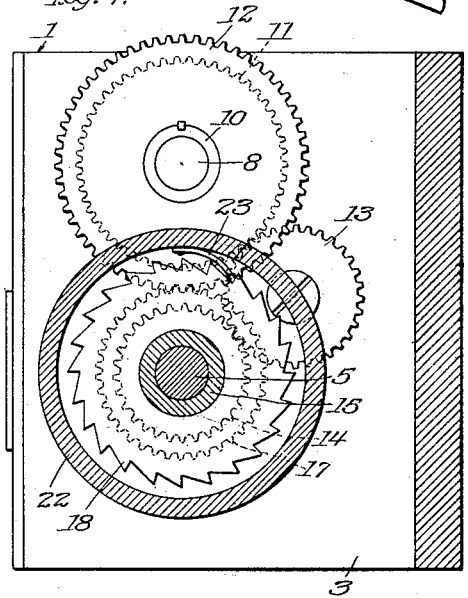
Witnesses:
Robert H. Weir
W. Perry Hahn
Inventor:
Herman C. Fuhrman,
by Jones, Addington, Ames & Seibold
Attys.

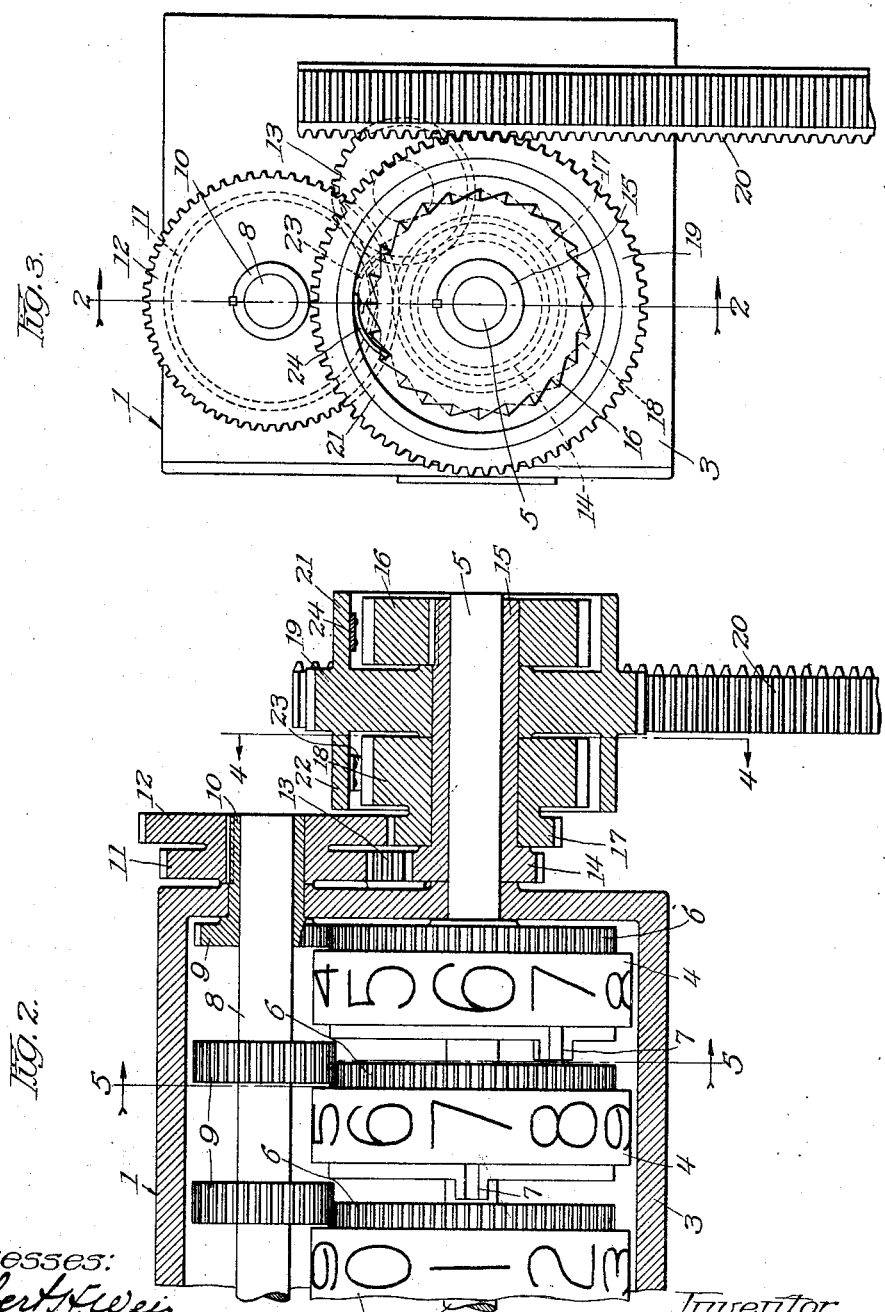

UNITED STATES PATENT OFFICE.

HERMAN C. FUHRMAN, OF CEDAR RAPIDS, IOWA, ASSIGNOR TO THE TOKHEIM MFG. CO., OF CEDAR RAPIDS, IOWA, A CORPORATION OF ARIZONA.

OPERATING MECHANISM FOR METERS.

1,191,171.  Specification of Letters Patent.  Patented July 18, 1916.

Application filed June 18, 1912. Serial No. 704,373.

*To all whom it may concern:*

Be it known that I, HERMAN C. FUHRMAN, a citizen of the United States, residing at Cedar Rapids, in the county of Linn and State of Iowa, have invented new and useful Improvements in Operating Mechanism for Meters, of which the following is a full, clear, concise, and exact description, reference being had to the accompanying drawing, forming a part of this specification.

My invention relates to improvements in meters and particularly meters for registering the amount of liquid delivered by pumps.

It is especially adapted for use in connection with pumps arranged to deliver a predetermined quantity of liquid upon each stroke of the piston of the pump, and to this end one embodiment of my invention, hereinafter described, is adapted to register the number of gallons, quarts, pints, or whatever unit of measurement is delivered by the pump.

One of the objects of my invention is to provide a meter which may be used with that class of pumps in which a predetermined amount of liquid is delivered upon both the up and down stroke of the piston.

Other objects and advantages of my invention will more fully appear in the following description of the embodiment of my invention which I have chosen for the purpose of disclosing the same.

Referring to the drawings illustrating one embodiment of my invention Figure 1 is a front elevation of the top of a pump showing my meter secured in operative position; Fig. 2 is a sectional view taken on the line 2—2 of Fig. 3; Fig. 3 is an end elevation of the meter; Fig. 4 is a transverse sectional view taken on the line 4—4 of Fig. 2; and Fig. 5 is a transverse sectional view taken on the line 5—5 of Fig. 2.

Referring to the embodiment of my invention illustrated in the drawings, the meter 1 is shown as mounted upon the top portion 2 of the pump. The meter is provided with a plurality of numeral bearing wheels 4 arranged within the casing 3 and adapted to be read through a suitable opening in the casing. Each of these wheels is provided on its periphery with a series of numerals from zero to nine.

All of the wheels are mounted upon a shaft 5 suitably journaled in the casing and each wheel on one side is provided with a gear wheel 6 and on its other side with a single tooth 7. Mounted upon a shaft 8 journaled in the casing above the shaft 5 is a plurality of gear wheels 9. The first of these gear wheels is adapted to mesh with the gear wheel 6 on the first of the numeral wheels. The next succeeding wheels are respectively adapted to mesh with the gear wheels on the sides of the other number wheels and also have their teeth in a position to be engaged by the single tooth 7, whereby after the first number wheel makes a complete rotation the second pinion 9 will be engaged by the single tooth, causing it to make a partial revolution, and through its engagement with the gear on the next succeeding number wheel causing the next succeeding number wheel to be rotated one number.

The first pinion 9 is provided with a sleeve 10 which extends through the casing and has keyed thereon a pair of gear wheels 11 and 12. The gear wheel 11 is driven through an idler 13 and a pinion 14 mounted on the sleeve 15 which surrounds an extension of the shaft 5. Mounted on the extreme end of the sleeve 15 is a ratchet 16, the purpose of which will more fully appear hereinafter. The gear wheel 12 is driven from a pinion 17 surrounding the sleeve 15 and connected with the ratchet wheel 18.

Rotatably mounted upon the sleeve 15 is a large gear 19 which is adapted to be engaged by a rack 20 secured on the upper end of the piston rod of the pump and arranged on each side of this gear wheel 19 is a pair of annular rings 21 and 22. A pawl 23 arranged within the ring 22 is adapted to engage the teeth of the ratchet 18. A second pawl 24 arranged within the annular ring 21 and facing in the opposite direction is adapted to engage the teeth of the ratchet 16. It will be understood that the teeth of the two ratchets 16 and 18 are arranged in opposite directions.

In the operation, I will assume that the parts are in the position illustrated and that the piston, and with it the piston rod of the pump, are being raised to deliver a predetermined unit of measurement of liquid. As the piston rod is raised the rack 20 rotates the gear wheel 19 in a contra-clockwise direction. The pawl 24 is, therefore, caused to engage the teeth of the ratchet 16, rotating the ratchet 16 in a contra-clockwise direction, and driving the pinion 14 in a contra-clockwise direction. Due, however, to the interposition of the idler pinion 13 the pinion 14 will drive the gear 11 in a contra-clockwise direction, and this gear from the first pinion 9 will rotate the first number wheel in a clockwise direction, moving it forward.

While the pawl 24 is in engagement with the teeth of the ratchet wheel 16, the pawl 23 will slide over the teeth of its ratchet wheel as these teeth are turned in an opposite direction. On the down movement of the piston the pawl 24 will rotate over the teeth of its ratchet and the pawl 23, due to the fact that the gear 19 is rotated in a clockwise direction, will engage the teeth of the ratchet 18 driving this ratchet in a clockwise direction. The pinion 17 connected with the ratchet engaging the gear 12 will drive the gear 12 in a contra-clockwise direction and with it the first pinion 9 which, due to its engagement with the gear 6 on the first number wheel, will rotate the first number wheel in a clockwise direction, advancing it one number. It will be thus seen that on each up and down movement of the piston rod the number wheel will be moved forward one number to indicate the unit of measurement delivered by the pump.

While I have shown and described one embodiment of my invention it will be understood that the invention may be embodied in various other forms and that various modifications and changes may be made in the form illustrated without departing from the spirit of my invention, as set forth in the appended claims.

Having thus described my invention, what I claim as new and desire to secure by Letters Patent, is—

1. In a device of the class described a ratchet and spur gear secured to rotate together, a second ratchet and a second spur gear secured to rotate together about the same axis as the first ratchet and gear, means for alternately rotating said ratchets in opposite directions, an idler gear meshing with said first spur gear, two spur gears secured to rotate together, one meshing with said second spur gear and the other meshing with said idler, said means for rotating the ratchets comprising a spur gear having flange portions surrounding said ratchets and pawls supported by said flange portions for engaging said ratchets.

2. In a device of the class described a shaft, a ratchet and spur gear secured to rotate together about said shaft, a second ratchet and spur gear secured together to rotate about said shaft, means for alternately rotating said ratchets in opposite directions, a third spur gear also rotatable about said shaft, an idler meshing with said first spur gear, a second shaft parallel to said first shaft, and three spur gears secured to rotate together about said second shaft, one meshing with said second spur gear, one meshing with said third spur gear and the other meshing with the idler.

3. In a device for converting the reciprocating rectilinear motion of a pump piston into the one way rotary motion of a register, the combination with a reciprocating rack, of a pair of ratchets, a member given rotary reciprocation by said rack, a pawl carried by said member and arranged to rotate one of said ratchets on the movement of said member in one direction, a second pawl carried by said member and arranged to rotate the other ratchet on the movement of said member in the opposite direction, a one way rotatable member, and a pair of gears operatively connected therewith, two pinions, one operatively connected with each of said ratchets, and an idler pinion meshing with one of said two pinions and with one of said gears, the other gear meshing with the other of said two pinions.

In witness whereof, I have hereunto subscribed my name in the presence of two witnesses.

HERMAN C. FUHRMAN.

Witnesses:
  A. E. SCHULTZ,
  C. E. AURACHER.

Copies of this patent may be obtained for five cents each, by addressing the "Commissioner of Patents, Washington, D. C."